United States Patent [19]

Meacham

[11] Patent Number: 5,268,241
[45] Date of Patent: Dec. 7, 1993

[54] MULTIPLE MANIFOLD FUEL CELL

[75] Inventor: G. B. Kirby Meacham, Shaker Heights, Ohio

[73] Assignee: Electric Power Research Institute, Inc., Palo Alto, Calif.

[21] Appl. No.: 839,258

[22] Filed: Feb. 20, 1992

[51] Int. Cl.$^5$ .............................................. H01M 8/04
[52] U.S. Cl. ........................................ 429/35; 429/39
[58] Field of Search ............................ 429/35, 38, 39

[56] References Cited

U.S. PATENT DOCUMENTS

| | | | |
|---|---|---|---|
| 4,444,851 | 4/1984 | Maru | 429/35 X |
| 4,510,213 | 4/1985 | Schnacke. | |
| 4,753,857 | 6/1988 | Hosaka | 429/39 X |
| 4,770,955 | 9/1988 | Ruhl | 429/33 |
| 4,963,442 | 10/1990 | Marianowski et al. | 429/39 X |
| 5,045,413 | 9/1991 | Marianowski et al.. | |
| 5,077,148 | 12/1991 | Schora et al.. | |
| 5,085,950 | 2/1992 | Primdahl | 429/38 X |

OTHER PUBLICATIONS

1990 Fuel Cell Seminar, Nov. 25–28, 1990, Program and Abstracts, T. Kahara, et al., Status of Large Sized MCFC Cell & Stack Technology Development at Hitachi, pp. 95–98.

*Primary Examiner*—Stephen Kalafut
*Attorney, Agent, or Firm*—David G. Conlin; George W. Neuner; Peter F. Corless

[57] ABSTRACT

The invention provides fuel cells and fuel cell stacks having a plurality of manifolds for providing reactive gases to cell layers. The manifolds are distributed across the planar area of the cells whereby the flow path lengths are reduced to the point that current collectors are not required. Substantial stack volume, cost and contact resistance reductions are also realized.

43 Claims, 6 Drawing Sheets

MULTIPLE MANIFOLD FUEL CELL

BACKGROUND OF THE INVENTION

1. Field of the Invention

The present invention relates to electrolytic fuel cells and assemblies of such cells. More particularly, the invention relates to an electrolytic fuel cell comprising a plurality of manifolds and assemblies of such cells.

2. Background Art

Fuel cells are electrochemical devices which react a hydrogen containing fuel gas with oxygen or an oxygen-containing gas to produce an electric current in an external circuit. Since the process is electrochemical, the level of pollutants released is typically much lower than for combustion based power generation technologies. The conversion efficiency is also higher: 40% to 55% compared 30% to 40% for typical combustion based electric power generation technologies. Fuel cell power generation systems also tend to be quiet and unobtrusive, and can be sited in residential and commercial areas.

Fuel cells have been used in space and other special applications for a number of years, but cost has so far prevented their widespread use for electric utility, industrial and commercial power generation. Certain systems providing up to 11 megawatts output have been demonstrated, and the cost has been greatly reduced through improved design and manufacturing technology and larger scale production. At this point, low enough costs are projected that substantial commercial applications seem possible before the year 2000. These applications are expected to be concentrated in situations in which low pollution is critical, or other attributes such as quiet, unobtrusive operation are necessary. Additional significant cost reductions could make fuel cells attractive to a broader and more cost conscious market.

Two key factors affect the cost per kilowatt of generating capacity. The first is the power output per unit area. As this increases, the cost per kilowatt of output decreases. Unit output is a result of the cell technology and operating variables such as system ambient pressure. The second factor is the material, labor and purchased component cost per unit area. Clearly, this cost directly affects the cost per kilowatt. In typical present day fuel cell designs the cost of the active electrochemical elements is often less than half the total expense for the particular fuel cell. The majority of the cost is for support, gas channeling and similar inactive elements.

Phosphoric acid, molten carbonate and solid oxide electrolyte fuel cells are at various stages of development for utility scale power generation. Phosphoric acid and molten carbonate designs are generally stacks of planar cells, and solid oxide designs include both planar and tubular configurations.

The active portion of a molten carbonate fuel cell is a layer of ceramic powder, saturated by molten carbonate salts, sandwiched between a porous metallic nickel anode and a porous nickel oxide cathode. The cell operating temperature typically is about 650° C. Fuel gas containing hydrogen is passed over the anode, and air containing oxygen is passed over the cathode. The gases react indirectly with each other through the electrolyte, causing an electrical potential to develop between the cathode and the anode. The cell can therefore supply power to an external circuit connecting the cathode and the anode. Typical electrical potential of such molten carbonate cells can be from 0.6 to 0.9 volts.

Multiple cells are combined by stacking individual cells in electrical series. The voltage generated by the cell stack is the sum of the individual cell voltages. Additional components must be added to the active components to build a stack. For example, separator plates are placed between the cells to separate the anode gases of one cell from the cathode gases of the adjacent cell. These are typically stainless steel with a protective nickel cladding layer on the anode side. Seals and flow conduits must be provided to channel fuel gas to the anodes and air to the cathodes, without mixing of the gas streams. Corrugated metal current collectors may be added to space the anode and cathode away from the separator plates, and provide passages to facilitate gas flow over the electrodes. The current collectors must provide a good electrical connection between the anodes and cathodes and the separator plates, and withstand the compressive loads which clamp the stack together. Additional components such as end plates, clamping mechanisms, gas supply and return manifolds, power takeoffs and insulation are required for a complete stack assembly.

The size of molten carbonate fuel cells has been scaled up over the years to achieve manufacturing and installation economies. Larger components require less handling labor per square foot. Dead area at the edge seals decreases as a percentage of total material area, increasing the proportion of material which is actively utilized. Further, the cost of non-repeat parts such as manifolds, end plates, axial load systems, and containment vessels tends to increase more slowly than active area and power output as the cell size increases. System plumbing and interconnection costs decrease per unit of output as the generating capacity of individual stacks increases. Increases in cell size have been paced by the ability to manufacture wide sheets of metal and active cell material with acceptable quality. Widths of up to 3 feet and areas of 4 to 10 square feet are now the state-of-the-art.

While such increases of cell sizes provide some advantages, larger cell size can also pose significant disadvantages. As cell size increases, the mass flow of gas across the electrodes increases in rough proportion to the flow path length. This in turn requires higher flow passages which add to the stack height without adding to power output per unit area.

Larger cells also increase cell complexity and material content. The separator plates and current collectors must bridge the gas flow passages while carrying compressive load and current, and must limit the contact pressure applied to the electrodes. Two or three formed heat and corrosion resistant alloy metal sheets are typically required per cell in current systems to form a structure which carries out these functions. These sheet metal assemblies are generally the largest cost element in the stack.

Furthermore, as cell complexity increases cell performance can decline. Multiple layers of sheet metal in pressure contact introduce resistive potential losses, and the electrode areas blocked by the current collectors introduce concentration gradient potential losses.

Still further, temperature differences across the cell structure can increase as cell size increases. The changing reaction and gas temperature conditions across the cells induce temperature differences and consequent stresses. The large cell size and the thinness of the components inhibit heat flow in the plane of the cell which would tend to even the temperatures out.

Small cells, in contrast, have comparatively short flow paths, and do not require current collectors. The anode and cathode porosity, augmented by dimples or grooves in the surfaces in contact with the separator plates, provides sufficient flow area. Thus in the case of small cells, bulky separator plate flow conduits are not required. This results in comparatively thin cell assemblies which have high volumetric power density and low material content. Further, the small size results in moderate thermal gradients.

SUMMARY OF THE INVENTION

The present invention is directed to improved fuel cells and assemblies of such cells. The invention is based in part upon the discovery of breaking large fuel cells into smaller areas by use of plurality of internal manifolds or shafts that provide reactant gas flow paths of a sufficiently short length so that current collectors and formed separator plates typical of prior large cells are not needed. The present invention thus provides substantial reductions in the size and material content of a cell stack of a given output relative to current large stack cell systems.

A single fuel cell of the invention is comprised of an anode layer, a cathode layer and an electrolyte layer. The three layer assembly is penetrated by a plurality of holes which serve as fuel gas and oxidant manifolds. Typically, about half the manifolds of the fuel cell are for fuel gas, and communicate with the anode layer. Suitably these fuel gas manifolds are further functionalized wherein a portion of said manifolds that carry fuel gas serve as fuel gas inlets and carry fuel gas to an anode layer, and the remaining portion of manifolds serve as fuel gas outlets, and carry fuel exhaust from an anode layer. The perimeters of these fuel gas manifolds are sealed where they pass through a cathode layer of the cell to prevent fuel gas flow into or out of the cathode layer. Typically the fuel gas manifolds are distributed across the area of the cell, whereby the flow path length between each gas inlet and exhaust opening in a cell layer is less than the planar dimensions of the cell. The balance of manifolds of the cell are for oxidant gas, and communicate with the cathode layer of the cell. These manifolds are also distributed across the area of the cell whereby the path length between each oxidant and gas inlet opening is less than the planar dimensions of the cell. Suitably these oxidant gas manifolds are further functionalized wherein a portion of said manifolds that carry oxidant gas serve as oxidant gas inlets and carry oxidant to a cathode layer, and the remaining portion of manifolds serve as oxidant outlets, and carry oxidant exhaust from a cathode layer. The perimeters of the oxidant gas holes are sealed where they pass through an anode layer of the cell to prevent oxidant gas flow into or out of the anode layer.

Fuel cell assemblies of the invention comprise a stack of a plurality of cells of the general type described above. The fuel cells of the assembly are typically substantially identical. Separator layers are interleaved between the fuel cells of the assembly to separate one cell from another. The separator layer(s) operate to separate the fuel gas of one cell from the oxidant gas of an adjacent cell. The separator layers are suitably metallic separator plates penetrated in the same pattern as the fuel cells of the assembly. The holes of all the stacked components of the assembly (i.e., cells and separator layers) line up in registration, and form manifold passages which penetrate the height of the stack. Each manifold passage of the assembly communicates exclusively with either the cathode or anode layer of each cell in the stack. The manifold passage may therefore be used to route fuel gas in and out of the anode layers, and oxidant gas in and out of the cathode layers, without mixing of the gases.

Although generally discussed in the context of molten carbonate fuel cells, the present invention is has application to phosphoric acid, solid oxide and other planar fuel cells.

BRIEF DESCRIPTION OF THE DRAWINGS

A more complete understanding of the invention may be provided by reference to the accompanying drawings wherein like reference numerals refer to like elements throughout the various figures.

DETAILED DESCRIPTION OF THE INVENTION

The present invention reduces flow paths of fuel and oxidant reactive materials of a fuel cell by a novel multiple manifold or shaft design. The manifolds axially penetrate a cell, i.e., the manifolds longitudinally extend through a cell perpendicular to the planar surface of the cell layers. The manifolds provide distribution of the reactive materials to areas surrounding manifolds outlets. By employing a plurality of manifolds, the fuel and oxidant gases can be distributed throughout a large cell. That is, a large cell is effectively broken into smaller areas with flow paths short enough that current collectors and formed separator plates are not needed. The small flow area required by the short flow paths is provided by the porosity of the cathode and anode structures, augmented by dimples or shallow grooves formed in their surfaces. The small flow areas are served by the noted array of internal fuel and oxidant manifolds (3A-3D) as shown in the Figures.

Figure 1:
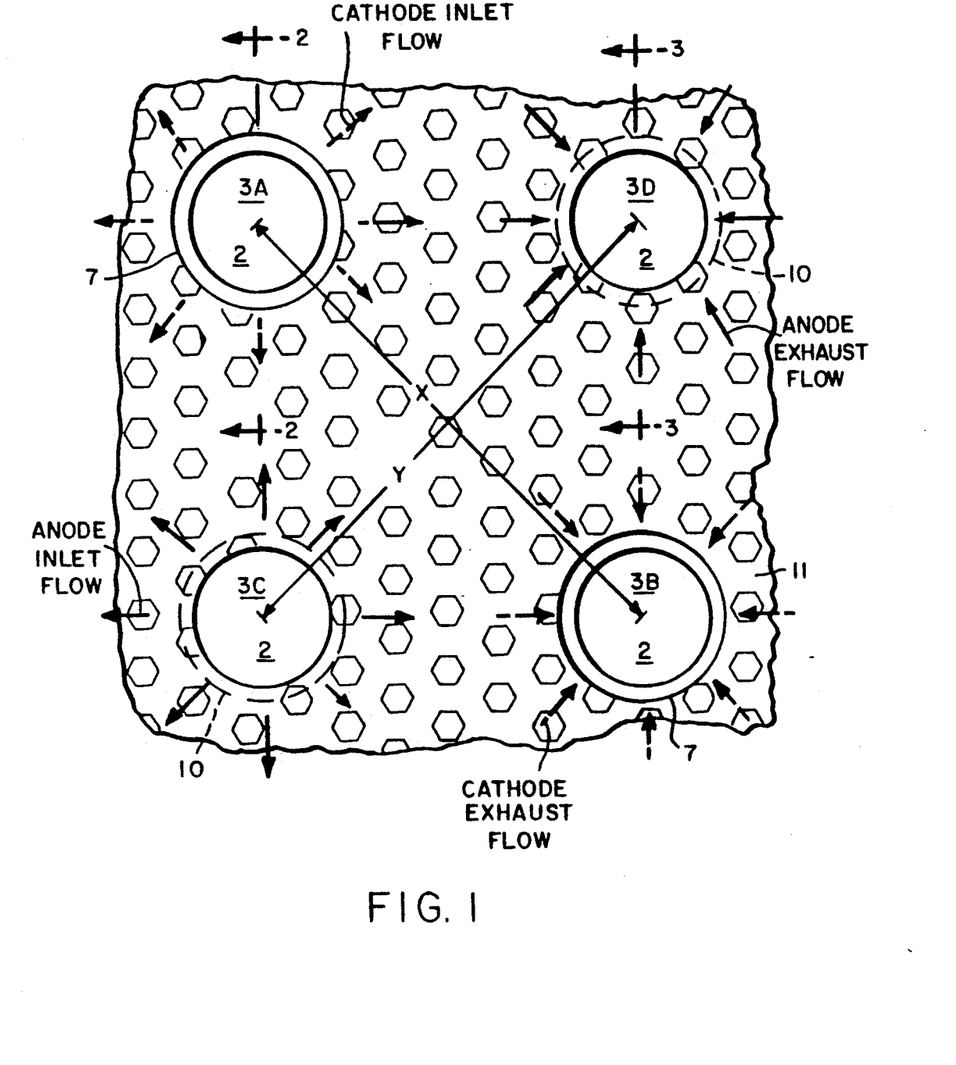
FIG. 1 is an above view of a portion of a fuel cell of the invention.

Preferably, the manifolds are further functionalized to provide four different "species" of manifold passages. More specificaly, as shown in FIG. 1, preferably manifolds 3 are segregated manifolds to provide either gas inlet and outlet functions. Thus, manifold 3A supplies oxidant gas to a cathode layer; manifold 3B collects oxidant exhaust from a cathode layer; manifold 3C supplies fuel gas to an anode layer; and manifold 3D collects fuel exhaust from an anode layer. Directions of flow of fuel and oxidant gases and exhaust to and from the respective manifolds are also depicted in FIG. 1.

As used herein, the term "flow path length" refers to the distance a reactive gas (oxidant gas or fuel gas) travels over an electrode layer between a gas inlet manifold and a exhaust or gas outlet manifold. Thus, in FIG. 1, the flow path length between manifolds 3C and 3D is the distance X—Y. The flow path length between manifolds 3A and 3B is the distance X.

As the reactive gas travels across an electrode layer, the gas reacts with the electrode and its content of reactive gas is depleted. The greater the flow path length, the larger the mass flow rate must be to assure that enough of the reactant remains to carry out a useful reaction near the end of the flow path across the electrode near the adjacent exhaust manifold.

Manifolds 3 are suitably formed by a plurality of holes 2 in each cell layer (e.g., cell layers of anode, electrolyte matrix, cathode, separator plate) where each of holes 2 in each cell layer is in at least partial registration with a hole in adjacent cell layer(s). Preferably holes 2 in each cell layer are of the same diameter and are in full registration with mating holes 2 in each adjacent cell layer. While the shape of manifolds 3 is generally discussed herein as being tubular, it should be appreciated that the present invention is not limited to tubular-shaped manifolds and that manifolds 3 suitably can be of other geometries provided the manifolds can provide communication of reactive gases to a fuel cell. FIG. 1 shows anode seal 7, cathode seal 10 and gas flow passages 11 formed by the dimpled electrode surface, all of which are more fully discussed infra.

Figure 2:
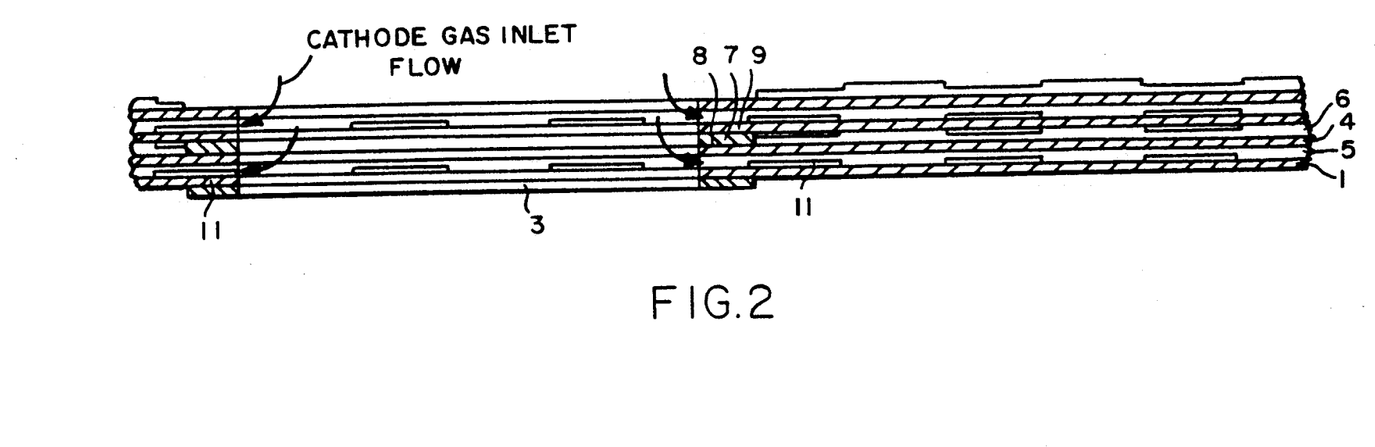
FIG. 2 is a cross-sectional view taken along the line 2—2 of FIG. 1.
Figure 3:
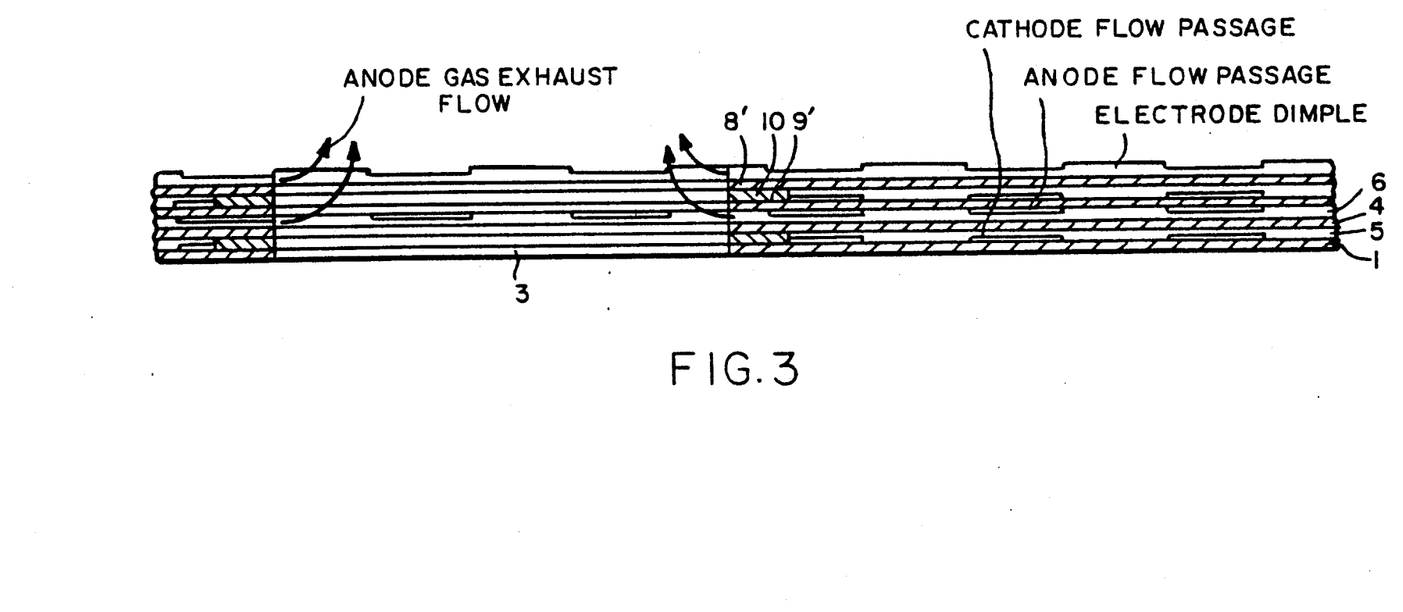
FIG. 3 is a cross-sectional view taken along the line 3—3 FIG. 1.

FIGS. 2 and 3 show separator plates 1 which are suitably employed in a multiple cell assembly. Plates 1 are typically flat sheets suitably constructed of stainless steel, nickel clad on the anode side. Separator plates 1 have a plurality of holes 2 which communicate with openings 2 of other cell layers to form manifold passages 3.

Three layer packages of active elements, each consisting of an electrolyte-matrix layer 4 sandwiched between cathode layer 5 and anode layer 6, are clamped between separator plates 1. These layers also have manifold holes 2 which are in at least partial registration with the holes 2 in the separator plates. When the components are stacked, the aligned holes 2 of each cell layer form internal manifold passages 3 which communicate with each cell layer. As discussed above, during use of the cell, a portion of the total number of internal manifold passages 3 carry fuel gas to and exhaust from the cell anodes (said manifold passages sometimes referred to as the anode passages), and another portion of the total number of manifold passages 3 carry oxidant gas to and exhaust from the cathodes (said manifold passages sometimes referred to as the cathode passages). Typically half of the total number of manifold passages carry fuel gas and half the manifold passages carry oxidant.

The anode gas passages 3 are isolated from the cathode electrodes as they pass through the cathode cell layers. Similarly, the anode cell layers are isolated from the axially extending cathode passages 3. This is accomplished in the anode layers as follows. Anode seal 7 is bonded to the top of the separator plate 1 so that they surround each of the cathode passages 3. Seals 7 are suitably constructed of aluminized stainless steel. Holes 2 in anode sheet 6 are made of a size sufficient to clear the rings so that the anode bears uniformly on the separator plate. An anode seal 7 is suitably about the same thickness as the anode so that in combination seal 7 forms a level surface to support the electrolyte matrix sheet 4. In the case of a molten carbonate cell, the molten carbonate saturating the matrix layer, 4 can wet the seal top surface 8 and form a gas seal 8' which prevents air in the cathode manifold passage from mixing with the fuel gas in the porous anode sheet. The gases can, however, react with each other through the electrolyte matrix by carbonate ion transport and a return flow of electrons through the seal ring. To prevent or inhibit corrosion of seal 7 by such action, seal 7 can be of an aluminized stainless steel construction. The aluminum oxide layer is generally insoluble in the electrolyte, and acts as a barrier to the electron flow.

An important aspect of the invention is seal ring joints 9 positioned between seal 7 and separator plates 1. Joints 9 preferably both prevent gas leakage and avoid any capillary paths between the air in a manifold passage 3 and the fuel in the anode. Such a path could fill up with electrolyte and form a corrosion cell which would attack the separator plate. A preferred design of joints 9 is to fusion weld or nickel braze the seal ring to the separator plate. Other potential designs of joints 9 include use of fused glass or ceramic cement to block gas leakage and exclude electrolyte from the joint.

Cathode seals 10 operate in similar fashion as anode seals 7 to separate the cathodes from the anode passages. Cathode seals are suitably constructed of aluminized stainless steel. The cathode seal rings are bonded to the bottom surface of the separator plate by cathode seal joints 9'. A preferred design of joints 9' is to fusion weld or nickel braze the seal ring to the separator plate, although other bonding means will be suitable such as those discussed above for the anode joints 9. The wet seals and corrosion concerns are essentially the same as with the anode seals.

The surfaces of the electrodes in contact with the separator plates are dimpled. This forms flow passages 11 which carry part of the gas flow across the electrodes. Additional reactive gas flows through the pores of the electrodes. The design trade-offs are between the flow path length, pressure drop, dimple geometry, and the number of manifold holes required per unit area of the cell. The path lengths across the anodes and cathodes and the cathode and anode manifold passage areas do not necessarily have to be the same. Since the cathodes typically require higher flow than the anodes, it may be advantageous to adjust the geometry to make the cathode flow paths shorter and the cathode manifold areas comparatively larger to minimize pressure drops.

Figure 4:
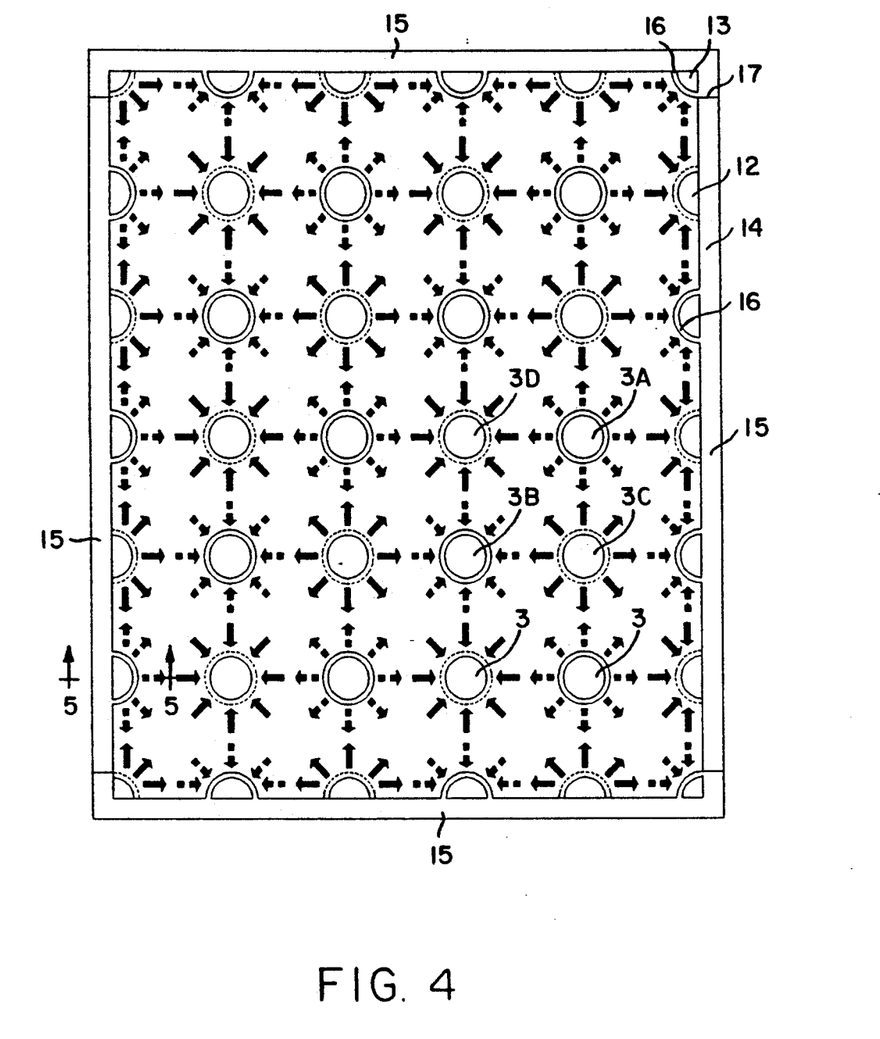
FIG. 4 is a top view of a cell layer of the present invention.

Referring now to FIG. 4, each manifold opening 3, except those at the edges, serves the surrounding plane surface of the cell layer. A particularly preferred design for the edges of the cell layer is shown in FIG. 4. The active area of the manifolds 3 along the edge of a cell layer ends at the centerline of the manifolds. That is, partial manifolds are employed along the cell layer edges to reflect the fact the edge manifolds serve less area. As shown in FIG. 4, preferably half round manifolds 12 are employed on the cell sides and quarter round manifolds 13 are employed on the cells corners. Alternative designs for the "edge" manifold openings can leave "dead" active areas near the cell layer perimeter which have reduced flow on either the anode or the cathode side. Directions of flow of fuel and oxidant oxidant gases and exhaust of a preferred manifold arrangement are also shown in FIG. 4.

Figure 5:
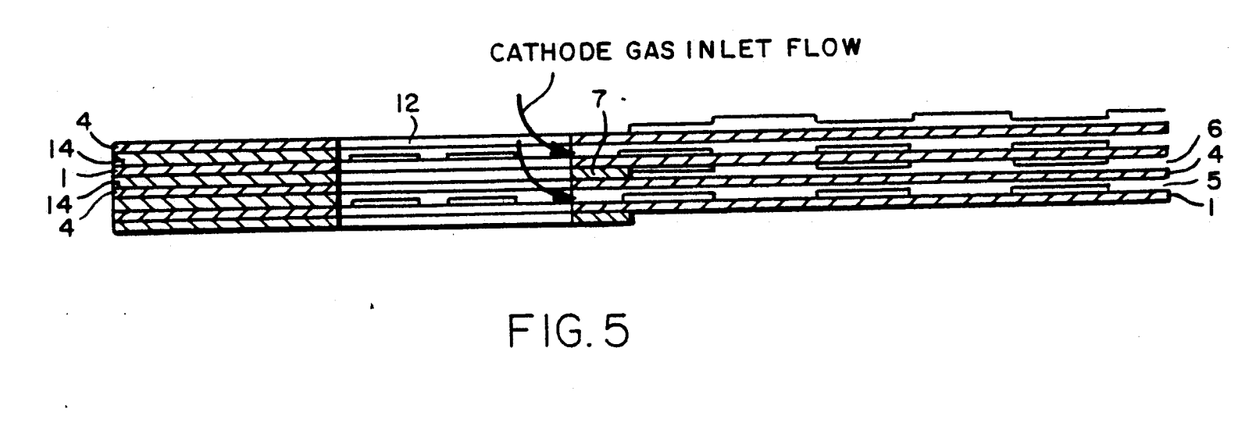
FIG. 5 is a cross-sectional view taken along the line 5—5 of FIG. 4.

A "picture frame" edge seal 14 made of strips of aluminized stainless steel 15 is suitably bonded to both the cathode and anode sides of the separator plates 1 to contain the gas within the stack. The half-round and quarter-round seal rings 16 needed at the edges and corners are suitably incorporated into the edge strips. In FIG. 5, a typical edge cross section is shown where a cross section of a manifold providing oxidant gas to a cathode layer is depicted. The corner joints are suitably welded (to form a welded joint 17) or brazed.

The process for manufacturing and assembling the fuel cells of the invention in many respects is in accordance with known methods. See, for example, U.S. Pat. No. 4,770,955, incorporated herein by reference for its disclosure of the manufacture of fuel cells and the use thereof. The cathodes 5 and anodes 6 are suitably manufactured by a porous sheet forming process such as tape casting, followed by sintering. The dimples on the electrodes may be added as part of the forming process or as a secondary operation, either before or after sintering. Holes 2 in the cathode and anode layers are suitably punched and the edges are trimmed to produce finished parts. A tooled punch process will produce highly repeatable part dimensions.

Separator plates 1 are suitably punched from flat sheets of nickel clad 300 series stainless steel sheet. Punch tooling will provide close dimensional control so that manifold openings 2 will match the cathode and anode openings. Punching has the further advantages of relatively inexpensive tooling and low press tonnage requirements.

Anode and cathode seal rings 7 and 10 are suitably punched from stainless steel and aluminized. One side of the seal ring must be protected from the aluminization process, or ground clean afterwards, to assure a good fusion weld or braze joint to separator plates 1.

Edge seal strips 15 are also suitably punched from stainless steel sheet. They are welded into "picture frames" 14 and then aluminized. As with the seal rings, one side should be clean. Alternatively, the brazing operation may be used to seal the corners and eliminate the need for welding. The separator plate assembly, consisting of the plate, seal rings and edge seals, is then made. Fixturing can be required to assure accurate alignment of the components so that they fit correctly with the electrodes. Nickel brazing in a vacuum or reducing atmosphere furnace is a good method to join the seals and the separator plate. A nickel brazing alloy applied as paste or metal preforms supplies the filler material. Alloys of nickel and phosphorus with melting points in the range of 1100° C. are available and will provide suitable performance. The filler flows into the joints 9 and 9' by capillary action, and fills the space completely provided the surfaces are clean and properly positioned. The brazing process should not harm the aluminized surfaces.

An automated fusion welding process, using resistance welding, laser welding or electron beam welding may also be used. The principal requirement is a continuous weld line to prevent gas leakage or electrolyte bridging. Care should be taken to avoid damage to the aluminized coating.

The electrolyte matrix 4 material is tape cast in sheet form and punched to final dimensions. As is typical practice, the electrolyte matrix material is put in the assembly in the "green" condition, and the binders are burned out during stack start-up.

The unit cells are assembled by nesting the electrodes into the recessed areas of the separator plate assemblies and aligning the matrix sheet on top of this subassembly. Electrolyte may be added at this stage or it may have been previously added to one or both of the electrodes. At start-up of operation of a cell, the electrolyte will melt and flow into the matrix and adjust to the proper levels in the electrodes.

The thus assembled unit cells then can be stacked to provide a stacked multiple cell assembly or fuel cell module. As is known in the art, the terms "fuel cell module" or "fuel cell power generation module" refer to, among other things, an apparatus that contains a single stack of fuel cells as well as an apparatus that comprises multiple stacks of fuel cells.

Figure 6:
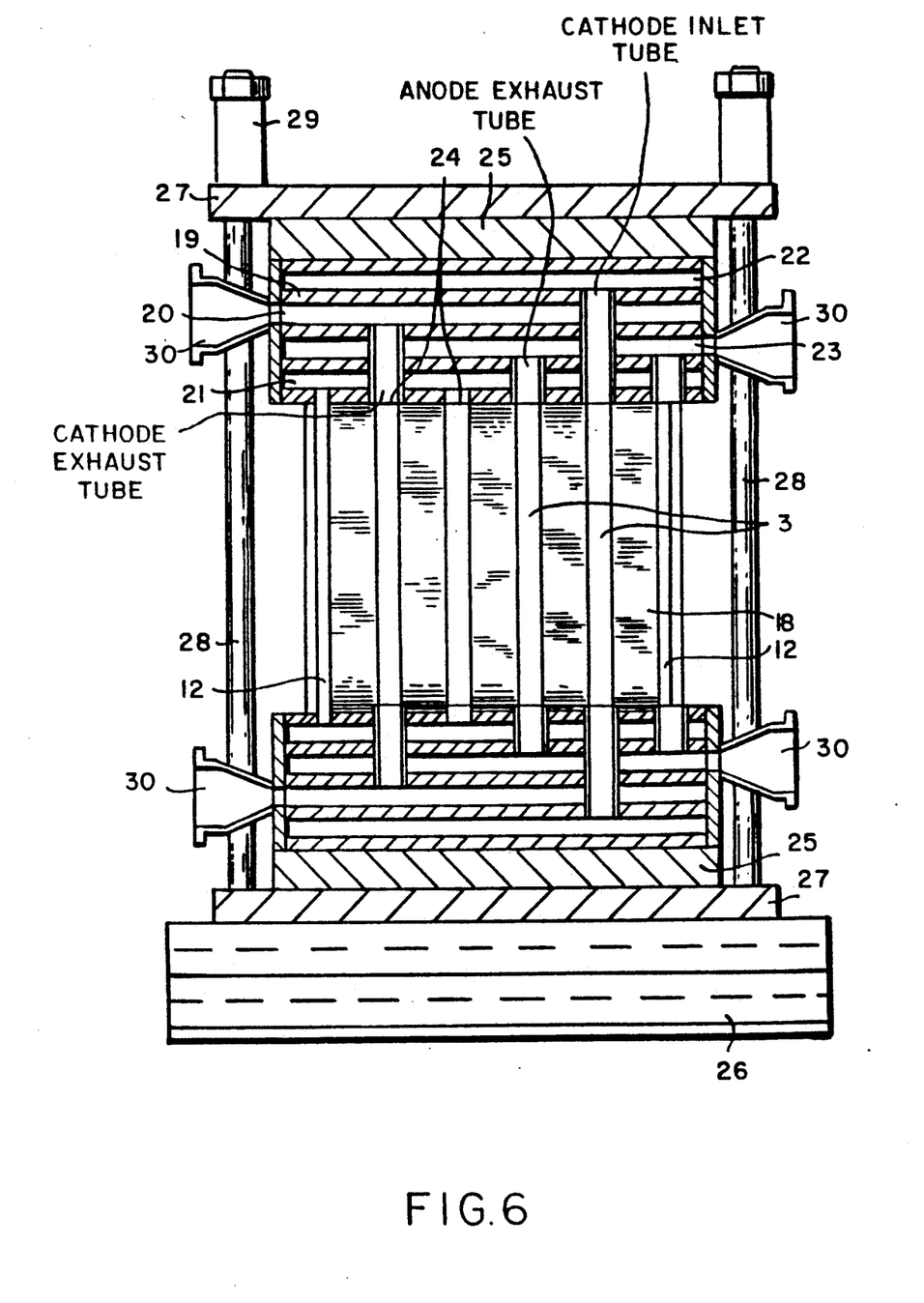
FIG. 6 is a front view of a cell stack assembly of the present invention.

The operation of stacking assembled unit cells should be straightforward as the edge seals will make the unit cells of a sufficient rigidity for good handling, and the lack of external manifolds makes the alignment somewhat forgiving. An overall stack assembly is shown in FIG. 6 The center part 18 of the assemby as shown in FIG. 6 is the active cell stack. This assembly depicted in FIG. 6 is a simple stack of unit cells held under axial compression.

As shown in FIG. 6, gas distribution plates 19 are placed above and below the stack. Plates 19 are suitably welded or brazed assemblies of sheets and tubes with internal distribution and collection plenums 20, 21, 22, 23 for fuel and oxidant gas flow. As shown in FIG. 6, each plenum suitably serves a different species of manifold. More specifically, FIG. 6 illustrates one embodiment of the invention where plenum 20 communicates with a fuel exhaust manifold 3D; plenum 21 supplies oxidant to an anode inlet manifold 3B; plenum 22 supplies fuel to a cathode inlet manifold 3C; and plenum 23 communicates with an oxidant exhaust manifold 3A. The faces which face the cell stack have openings 24 which align with the manifold passages and connect to the appropriate plenums. The stack is suitably fed with fuel and oxidant gases through the plenums and manifold passages from each end of the cell stack to allow greater height for a given manifold passage size. The electric power pickups (not shown) are connected to these plates. Other constructions such as cored stainless steel castings are also possible. These gas distribution plates can be salvaged at the end of the stack's life and reused.

Thermal and electrical insulation blocks 25 are placed above and below the gas distribution plates. Blocks 25 isolate the active cell stack from the support and clamping structures. A suitable material of construction for blocks 25 is a low density ceramic, for example the alumina and silica containing material sold under the trade name of KAOWOOL MB-823 Fiberboard.

A base plate 26 is placed below the stack, and pressure plates 27 are placed on each end. Plates 27 are connected by axial load tie bars 28 with axial load springs 29 or similar follow-up system to accommodate stack height changes. A thermal insulation blanket (not shown) is suitably wrapped around the cell stack and the gas distribution plates. The base plate, pressure plate and axial load hardware are typically outside the blanket in an area of relatively lower temperature.

Four pipes (not shown) each connect to the bottom and top gas distribution plates. These pipes connect to the plenums through flow transition sections 30 which are welded or bolted to the distribution plates. Insulating couplings (not shown) are used to maintain electrical isolation.

As discussed above, the present invention permits notable reductions in the size and material content of a cell stack relative to prior systems. For example, the height of a unit cell in some current molten carbonate fuel cell stack systems is between 0.200 to 0.400 inches.

In comparison, the height of a distributed manifold unit cell of the present invention suitably can be about 0.100 inches or less. As a first approximation, this increases the volumetric power density of a stack by a factor of 2 to 4 at a given output per square foot of active area. This leads to a number of benefits. For example, assuming a power output of about 120 watts per square foot of active area, and that active area is about 85% of gross area, the power density of the distributed manifold unit cell of the invention is over 10 kilowatts per cubic foot of cell stack. This should render the cell suitable for use in applications such as transportation. Additionally, non-repeat part costs such as insulation, enclosures, axial load systems, and plumbing should drop by a factor of 2 to 4 on a per kilowatt basis, since these costs tend to be a factor of the number and physical size of the stacks, not their output.

The plurality of manifolds distributed across the planar area of a fuel cell of the invention adds a degree of freedom to the design process which does not exist with conventional manifold configurations. Most importantly, it uncouples the flow path length and cross section area from the overall cell size. This uncoupling allows elimination of current collectors; as a consequence significant increases in power density and reductions in material requirements can be realized.

Another advantage of a cell stack assembly of the present invention is its structural integrity. The cell stack of the present invention suitably is essentially an assembly of flat sheets, without formed current collectors which can yield or cause stress concentrations.

The fuel cell of the invention will readily scale up or down in cell area, since the flow conditions in the cells are a function of the repeating manifold pattern, and are essentially independent of the total cell size. A 1 foot by 1 foot cell, for example, should provide the same operation and performance characteristics as a 4 foot by 8 foot cell. Cell sizes as large as 4 foot by 8 feet will be suitable. At a 10 foot active height, such a cell stack would have over 3 megawatts output in a truck shippable package.

Temperature and gas composition variations will be relatively independent of cell size, and primarily a function of the repeating manifold pattern. It is therefore possible to design for specific temperature and composition values independent of the overall cell size. Further, the distributed manifold configuration of the present invention may allow faster heat-up and cool-down cycles than conventional cells of the same size, since transient temperature gradients are reduced.

To control the temperature of a stack cell assembly, a gas flow can be superimposed along the length of the cell stack, in addition to the flow of reactant gases which passes between the cells. This flow should be effective in removing heat from the stack, since the multiple manifolds have a large surface area, and the heat transfer distance from any part of the cell to a manifold passage is short. Such a gas flow provides means to control the reactant gas flow through the cells independently of the cooling flow. Such a gas flow may also be useful in heating the stack quickly and uniformly to operating temperature at startup.

The distributed manifold cell design of the present invention can be implemented in a number of configurations and with a range of design parameters. For example, a suitable cathode layer thickness is between about 0.015 and 0.050 inches, more preferably about 0.030 inches thick. A suitable anode layer thickness is between about 0.010 and 0.040 inches, more preferably about 0.030 inches thick. A suitable thickness of the electrolyte matrix is between about 0.010 and 0.030 inches, more preferably about 0.020 inches thick.

A separator plate used in the cell assemblies of the invention is suitably between about 0.008 and 0.025 inches thick, more typically about 0.020 inches thick.

The diameters of manifolds of the fuel cells of the invention suitably may vary within a somewhat wide range. For example, a manifold of about 0.50 inches or less will be suitable as well as manifold diameters of about 2 inches or greater. More typically, the manifold diameters will be in a range of from about 0.50 to 2.0 inches. Suitable flow path lengths also may vary somewhat widely. For example, flow path lengths of about one inch or greater will be suitable.

In one fuel cell of the invention, the manifolds are about 1 inch in diameter and on 2.83 inch centers. The flow path length is 4 inches center-to-center (that is, the distance X or Y shown in FIG. 1 is 4 inches as measured from the center of one manifold to the center of the corresponding adjacent manifold). The surrounding wet seal disk is 1.25 inches in diameter, leaving a 0.125 inch seal width. The active area is, therefore, about 85% of the gross area, and the manifold openings total about 12% of the active area. The electrode dimple height is about 0.010 for the 4 inch flow path length. This should result in the same order-of-magnitude of flow velocity for a given volumetric rate per square inch of electrode area as a more typical 0.050 to 0.100 inch thick flow path serving a 30 to 40 inch path length. Pressure drops should be on the order of 0.30 to 0.40 pounds per square inch through the flow fields between the inlet and outlet manifolds. The pressure drop in the manifold passages should be on the order of 0.10 pounds per square inch per foot of stack height. One inch diameter manifold openings should be able to serve on the order of 500 cells from one end, or 1,000 cells with gas supplied from both ends.

The dimple approach to creating flow fields allows flows in all directions, and can be formed on the electrodes without regard to the manifold hole locations. It is also possible to form flow channels in the faces of the electrodes which register with the manifold openings to tailor the flow patterns.

The seal ring wet seal width of 0.125 inches is narrower than typical, but is over 6 times the matrix thickness. If seal integrity is a problem, use of either wider seals or thinner matrix sheets will reduce the gasket stress. Plate flatness and clamping pressure uniformity of the fuel cells of the invention will be good due to fact that the mating metal parts are well supported, simple flat punchings.

An edge seal width of 0.50 inches is suitable and in the range of typical practice. This edge seal width should be sufficient to provide the required compressive support for the stack and to seal the gases.

A preferred distributed manifold fuel cell that comprises fuel and oxidant inlet and exhaust manifolds has the following configuration of manifolds 3. Manifolds 3 are positioned across the planar surface of the fuel cell and are positioned at the intersections of an essentially square grid according to the following rules: fuel inlet and exhaust manifolds are positioned so that fuel gas flows essentially diagonally across each square of said grid through the anode layers; oxidant inlet and exhaust manifolds are positioned so that oxidant gas flows essentially diagonally across each square of said grid through the cathode layers at essentially right angles to above-mentioned direction of fuel flow; and gas flows through each manifold opening into or out of all the squares surrounding that manifold opening.

More preferably the manifold configuration is of the above described prefered type and the outer boundary of the active cell area passes approximately through the centers of the outermost manifold openings 3, and the edge manifold openings are about half the area of the central manifold openings (i.e., manifold openings that do not intersect a planar edge of a cell layer), and the corner manifold openings are about one quarter the area of the central manifold openings. These reduced manifold areas reflect the fact that they are serving smaller cell areas at the edge of the cells. A corner manifold opening is one that intersects two planer edges of a cell layer. Such a preferred configuration is generally shown in FIG. 4.

The foregoing description of the invention is merely illustrative thereof, and is understood that variations and modifications can be effected without departing from the scope or spirit of the invention as set forth in the following claims.

What is claimed is:

1. A planar electrolytic fuel cell comprising a plurality of manifolds that penetrate layers of the fuel cell, the manifolds distributed across the planar surface of the fuel cell and providing for communication of reactant gases to the fuel cell, wherein said manifolds are separated fully from each adjacent manifold by a reactive area of the fuel cell.

2. A planar fuel cell comprising an anode and a cathode layer, the anode layer comprising a plurality of fuel openings and the cathode layer comprising a plurality of oxidant openings, the fuel openings being distributed across the anode layer and the oxidant openings being distributed across the cathode layer, wherein said fuel and oxidant openings are separated fully from each adjacent fuel or oxidant opening by a reactive area of the fuel cell.

3. The fuel cell of claim 2 where the fuel openings are distributed across the anode layer whereby the flow path length between each fuel opening is less than the planar dimensions of the cell.

4. The fuel cell of claim 2 where the oxidant openings are distributed across the cathode layer whereby the flow path length between each oxidant opening is less than the planar dimensions of the cell.

5. The fuel cell of claim 2 where the fuel cell comprises an anode manifold extending essentially perpendicular to the plane surface of the cell layers, the anode manifold comprising said fuel openings, and the anode manifold comprising seal members in the cathode layer.

6. The fuel cell of claim 5 where the seal members prevent communication of fuel passing through the anode manifold with the cathode layer.

7. The fuel cell of claim 2 where the fuel cell comprises a cathode manifold extending perpendicular to the plane surface of the cell layers, the cathode manifold comprising said oxidant openings, and the cathode manifold comprising seal members in the anode layer.

8. The fuel cell of claim 7 where the seal members prevent communication of oxidant gas passing through the cathode manifold with the anode layer.

9. The fuel cell of claim 2 where the edges of the cathode layer and anode layer comprise seals which retain oxidant gas in the cathode layer and fuel in the anode layer.

10. The fuel cell of claim 2 where the manifolds comprise separate fuel inlet manifolds to provide fuel gas to the anode layer, fuel exhaust manifolds to receive fuel exhaust from the anode layer, oxidant gas inlet manifolds to provide oxidant gas to the cathode layer, and oxidant exhaust manifolds to receive oxidant gas from the cathode layer of the cell.

11. The fuel cell of claim 10 where said manifolds are positioned across the planar surface of the fuel cell at the intersections of an essentially square grid,
wherein fuel inlet and exhaust manifolds are positioned so that fuel gas flows essentially diagonally across the anode layer from a fuel inlet manifold to a fuel exhaust manifold, and
oxidant inlet and exhaust manifolds are positioned so that oxidant flows from an oxidant inlet manifold to a oxidant exhaust manifold essentially diagonally across the cathode layer and at essentially right angles to said fuel flow.

12. The fuel cell of claim 11 in which the outer boundary of the active cell area passes approximately through the centers of the perimeter manifold openings, said perimeter manifold openings that intersect a single edge of said active cell area boundary being about half the area of the manifold openings positioned within said active cell area, and the manifold openings that intersect two edge of said cell active area being about one quarter the area of the manifold openings positioned within said active cell area.

13. The fuel cell of claim 2 wherein the manifolds are positioned so that fuel gas flows essentially diagonally across the anode layer from a fuel inlet manifold to a fuel outlet manifold.

14. The fuel cell of claim 13 wherein the manifolds are positioned so that oxidant flows essentially diagonally across the cathode layer from an oxidant inlet manifold to an oxidant outlet manifold.

15. The fuel cell of claim 14 wherein oxidant flows across the cathode layer at essentially right angles to the direction of fuel flow across the anode layer.

16. The fuel cell of claim 15 wherein manifolds intersect the outer boundary of the active cell area.

17. The fuel cell of claim 14 wherein manifolds intersect the outer boundary of the active cell area.

18. The fuel cell of claim 13 wherein manifolds intersect the outer boundary of the active cell area.

19. The fuel cell of claim 2 wherein the opening of manifolds that intersect the outer boundary of the active cell area have a smaller manifold area than that of manifolds positioned within the active cell area and not intersecting the outer boundary of said cell area.

20. The fuel cell of claim 19 wherein the manifolds that intersect a single side of said active cell area boundary have an opening with about half the area of the opening of manifolds positioned within the active cell area.

21. The fuel cell of claim 20 wherein manifolds that intersect two sides of said active cell area have an opening with about one quarter the area of the opening of manifolds positioned within the active cell area.

22. The fuel cell of claim 2 wherein the anode layer has a dimpled surface.

23. The fuel cell of claim 2 wherein the cathode layer has a dimpled surface.

24. A fuel cell power generation module comprising a stack of two or more fuel cells in series connection, the stack comprising a plurality of manifolds that penetrate the cells, said manifolds distributed across the planar surface of the fuel cells, and wherein said manifolds are separated fully from each adjacent manifold by a reactive area of each fuel cell of the module.

25. The module of claim 24 where a portion of the total number of the manifolds communicate with the anode layers of each of said fuel cells and a portion of the total number of the manifolds communicate with the cathode layers of each of said fuel cells.

26. The module of claim 25 where said anode communicating manifolds comprise seal members, the seal members positioned in areas of the manifold that traverse the cathode layers of each of said fuel cells.

27. The module of claim 25 where said cathode communicating manifolds comprise seal members, the seal members positioned in areas of the manifold that traverse the anode layers of each of said fuel cells.

28. The module of claim 25 where the perimeter of the cathode layers and anode layers of each cell comprises seals that retain oxidant gas in the cathode layers and fuel gas in the anode layers.

29. The module of claim 24 where an electrically conductive gas distribution plate is positioned on at least one end of stack of the fuel cells in series connection, the gas distribution plate comprising,
   (a) passages communicating with said manifolds of the fuels cells,
   (b) external connections for inlet of fuel and oxidant gases to the module and exhaust of fuel and oxidant gases from the module, said external connections communicating with said passages that communicate with said manifolds of the fuel cells.

30. The module of claim 29 where gas distribution plates are placed at both ends of the stack of fuel cells in series connection and one or more gas distribution plates are placed in intermediate positions in the stack of fuel cells, said plates having passages therethrough which communicate with the manifolds of the fuel cells.

31. The module of claim 24 wherein fuel cells of the module are separated from adjacent fuel cells by a separator plate.

32. The module of claim 31 wherein the surface of a fuel cell electrode layer contacting a separator plate is dimpled to thereby form flow passages across said electrode layer.

33. A fuel cell comprising an anode layer and a cathode layer and a plurality of manifolds that penetrate said layers of the fuel cell, the manifolds distributed across the planar surface of the fuel cell and providing for communication of reactant gases to the fuel cell, the manifolds being positioned that fuel gas flows essentially diagonally across the anode layer from a fuel inlet manifold to a fuel outlet manifold.

34. The fuel cell of claim 33 wherein the manifolds are positioned so that oxidant flows essentially diagonally across the cathode layer from an oxidant inlet manifold to an oxidant outlet manifold.

35. The fuel cell of claim 34 wherein oxidant flows across the cathode layer at essentially right angles to the direction of fuel flow across the anode layer.

36. The fuel cell of claim 34 wherein manifolds intersect the outer boundary of the active cell area.

37. The fuel cell of claim 35 wherein manifolds intersect the outer boundary of the active cell area.

38. The fuel cell of claim 33 wherein manifolds intersect the outer boundary of the active cell area.

39. A fuel cell comprising a plurality of manifolds distributed across the planar surface of the cell and providing for communication of reactant gases to the fuel cell, the opening of manifolds that intersect the outer boundary of the active cell area having a smaller manifold area that the opening of manifolds positioned within the active cell area and not intersecting the outer boundary of said cell area.

40. The fuel cell of claim 39 wherein manifolds that intersect a single side of said active cell area boundary have an opening with about half the area of the opening of manifolds positioned within the active cell area.

41. The fuel cell of claim 40 wherein manifolds that intersect two sides of said active cell area have an opening with about one quarter the area of opening of manifolds positioned within the active cell area.

42. A planar fuel cell comprising a plurality of manifolds that penetrate layers of the fuel cell, the manifolds distributed across the planar surface of the fuel cell and providing for communication of reactant gases to the fuel cell, wherein the total cross-sectional area of said manifolds is about twelve percent of the active area of the fuel cell.

43. The fuel cell of claim 42 wherein said manifolds are separated fully from each adjacent manifold by a reactive area of the fuel cell.

* * * * *